ATTORNEYS

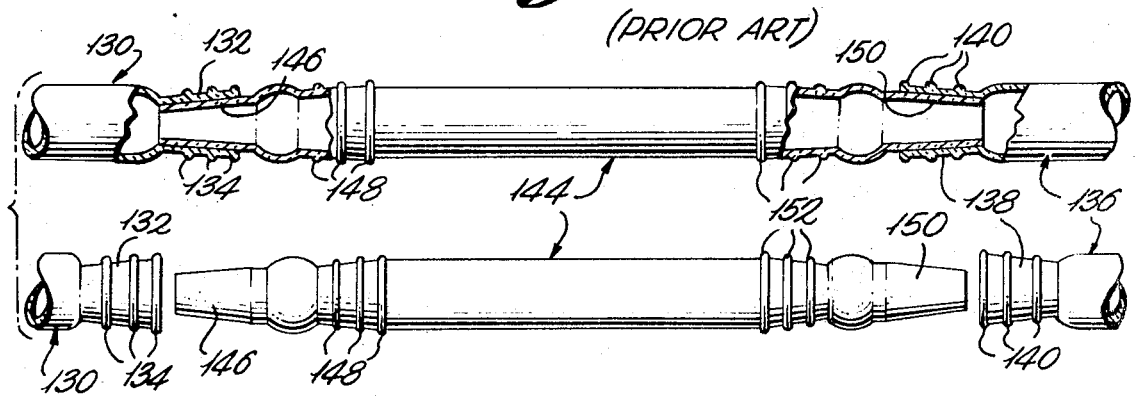
Fig. 2. (PRIOR ART)
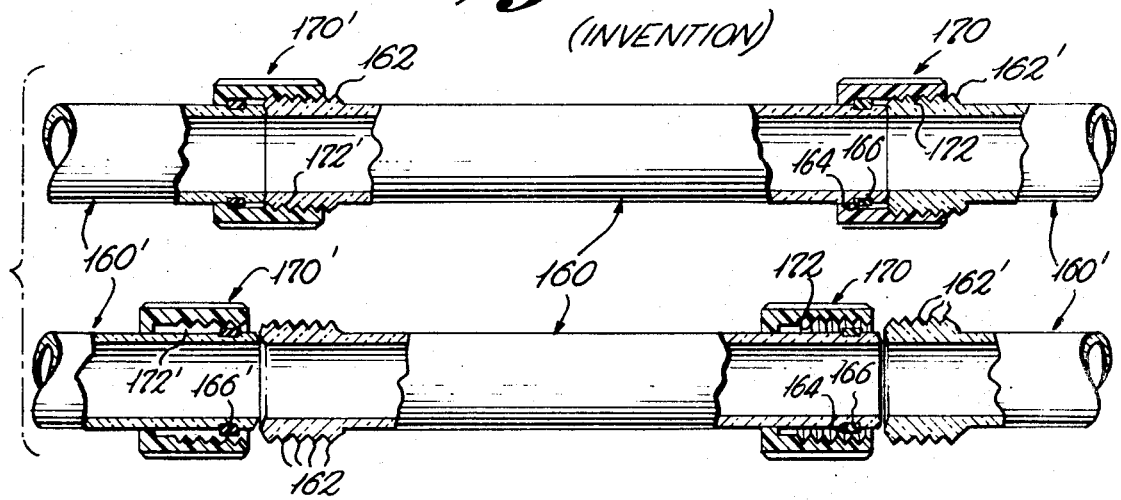
Fig. 3. (INVENTION)
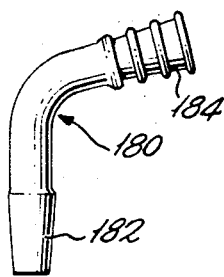
Fig. 4. (PRIOR ART)
Fig. 5. (INVENTION)
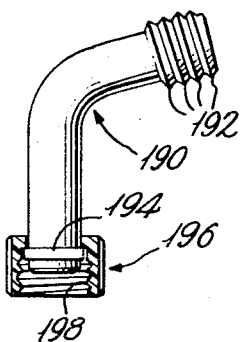
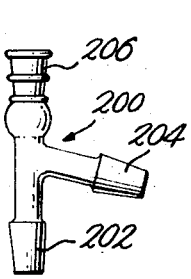
Fig. 6. (PRIOR ART)
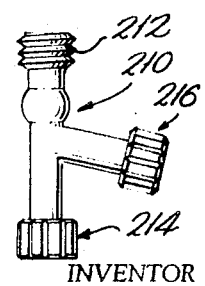
Fig. 7. (INVENTION)
INVENTOR
Edwin D. Phillips
BY Shoemaker and Mattare
ATTORNEYS

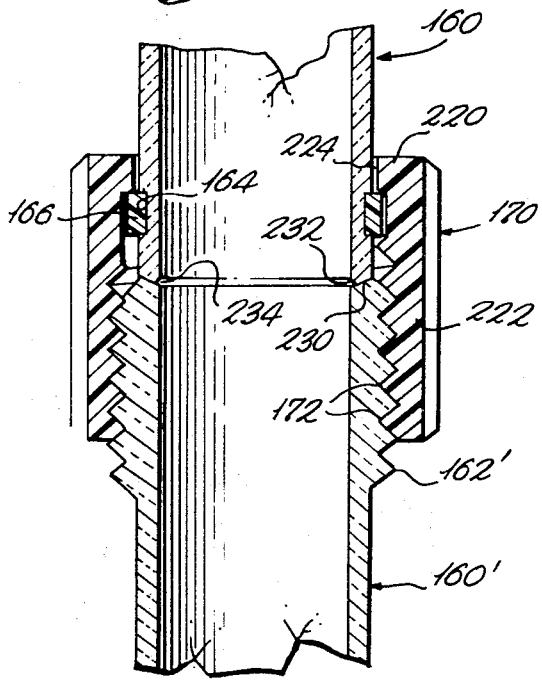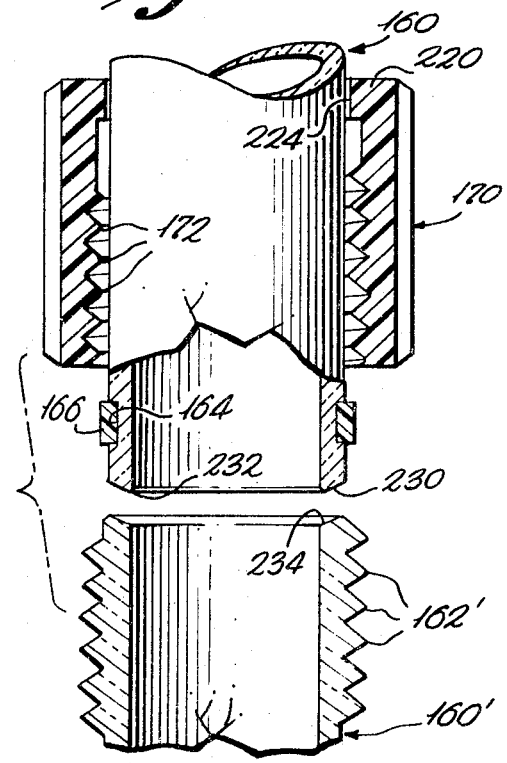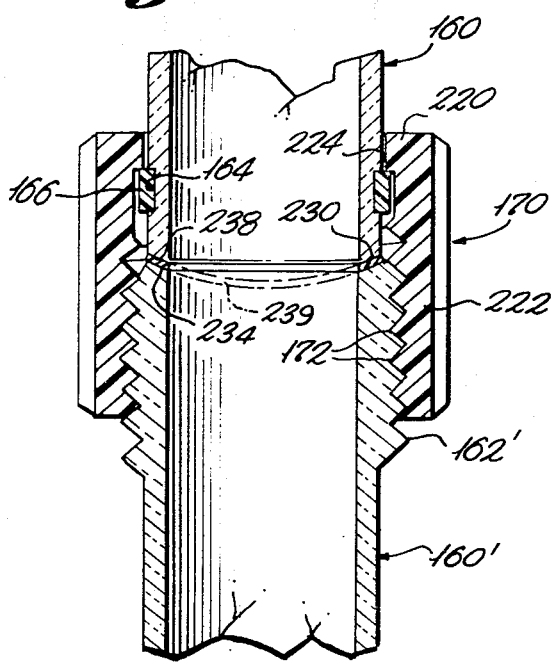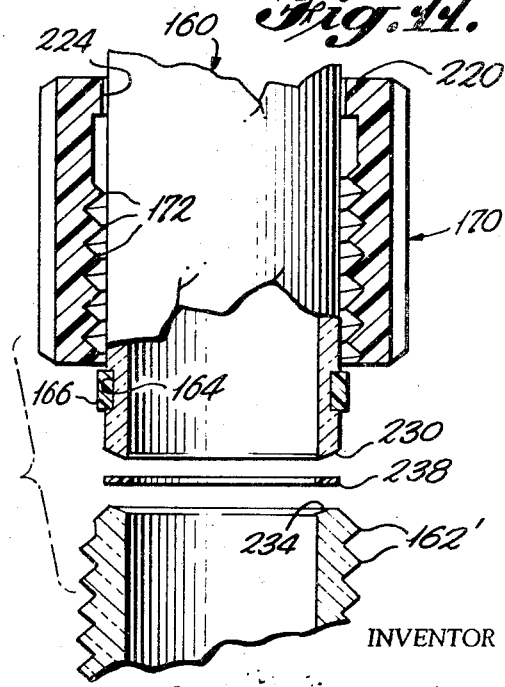

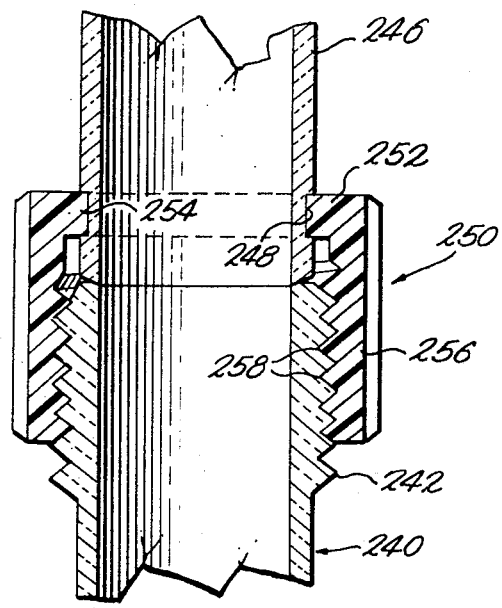
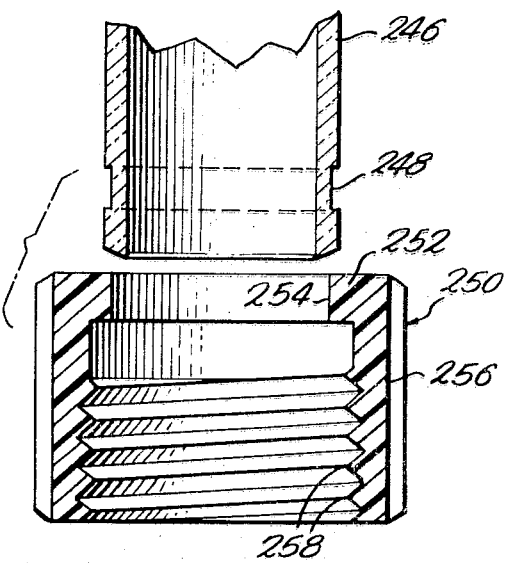
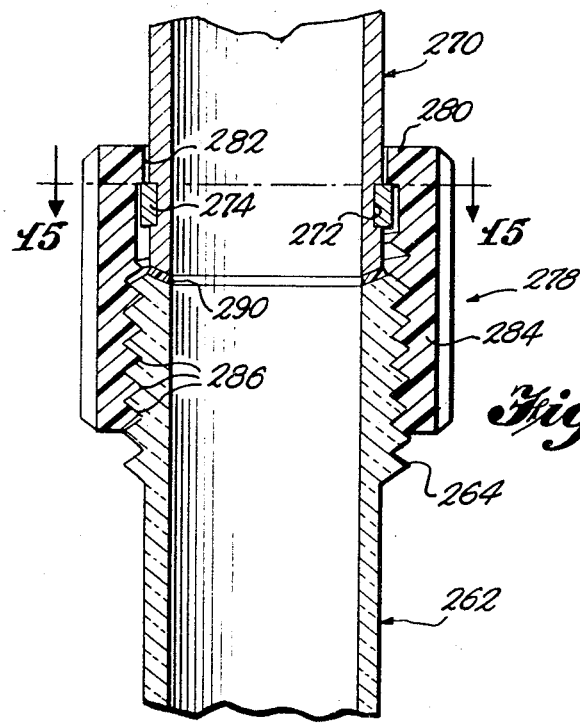
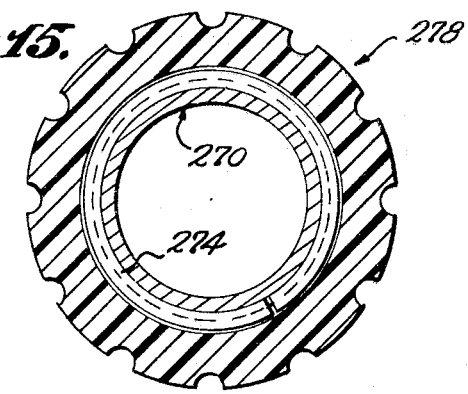
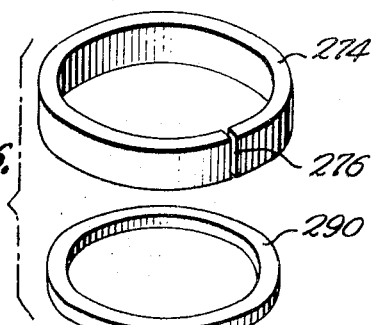

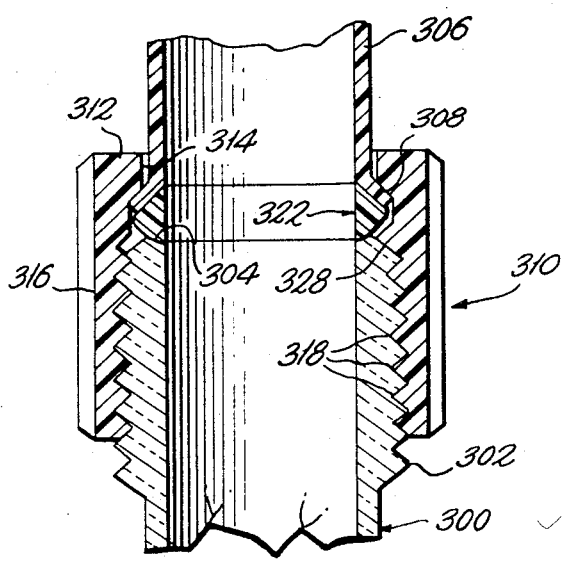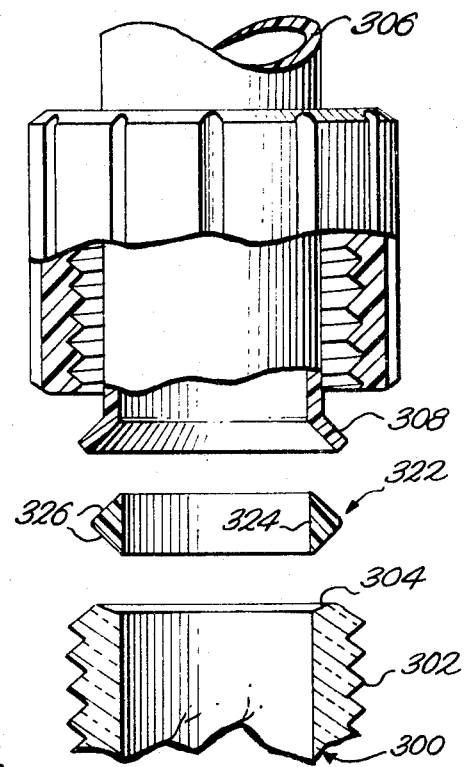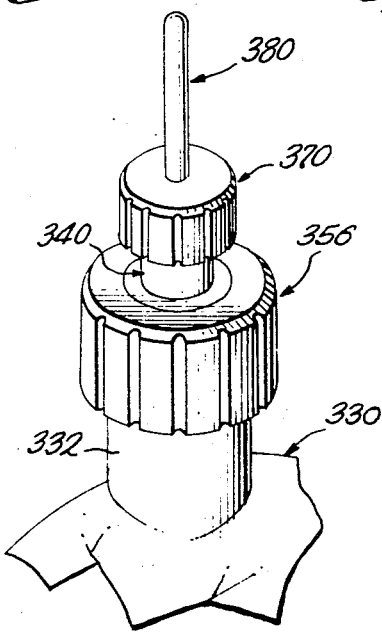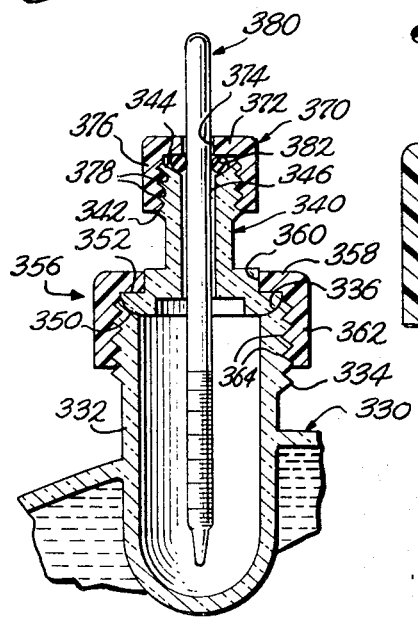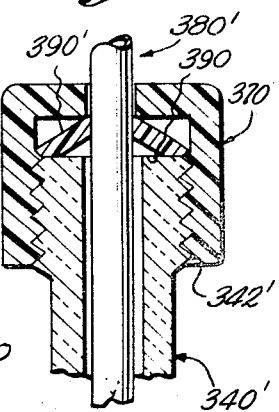
INVENTOR
Edwin D. Phillips
BY Shoemaker and Mattare
ATTORNEYS INVENTOR
Edwin D. Phillips BY Shoemaker and Mattare

United States Patent Office 3,544,281
Patented Dec. 1, 1970

3,544,281
LABORATORY EQUIPMENT INCLUDING NOVEL CONNECTOR MEANS FOR TUBULAR GLASS MEMBERS
Edwin D. Phillips, 170 Albert St.,
North Plainfield, N.J. 07060
Filed Dec. 14, 1967, Ser. No. 690,601
Int. Cl. B01l 11/00; F16l 9/06, 9/10
U.S. Cl. 23—292
22 Claims

ABSTRACT OF THE DISCLOSURE

Laboratory equipment including a tubular glass portion having machine threads thereon. Novel connector means for connecting the glass portion to another portion of laboratory equipment includes a coupling member having a portion for receiving and holding such other portion of the laboratory equipment and also having threads thereon for engagement with the machine threads on the glass tubular portion to rigidly connect the portions of laboratory equipment to one another and to permit ready release of one of the portions without disturbing the position of the adjacent portions when desired.

BACKGROUND OF THE INVENTION

The present invention relates to laboratory equipment including many different types of scientific glassware such as bottles, burettes, tubes, condensers, cylinders, flasks, joints, pipettes, and the like as well as various apparatus commonly employed in chemistry laboratories; and wherein a unique connector means is employed for connecting various portions of the apparatus.

Glass is a very desirable substance for use in chemistry laboratories and the like due to the fact that it is inert, and for many years the problem has existed of providing a ready means for connecting and disconnecting various units of scientific glassware with one another.

The common practice in the prior art for connecting various units of scientific glassware is to employ a so-called standard taper joint wherein an end of a tubular portion of one unit is provided with a generally frusto-conical outer surface, while the end of a cooperating tubular portion on another unit of laboratory equipment is provided with a complementary tapered recess whereby the frusto-conical tapered portions are adapted to nest together to form a means of connecting the units to one another.

Such standard taper joints as are commonly employed in the prior art present a number of problems. Firstly, such joints are relatively difficult to make and approximately 90% of the work involved in manufacture of such joints is done by hand. This is obviously a very inefficient operation in these days of automated machinery.

Even with the best of taper joints as now employed in the art, the arrangement will not hold a high vacuum without employing additional means to ensure an effective seal. A common expedient is the use of grease which is placed on the interengaging surfaces of the joint. This procedure is of course time consuming and expensive. A further means of obtaining an improved seal is the provision of an auxiliary sleeve of plastic or the like which is interposed between the cooperating surfaces of the joint and compressed therebetween when the joint is tightened. This of course increases the expense.

A major problem when utilizing such prior art arrangements is the fact that the taper joints have a tendency to freeze together and cannot be separated after the laboratory equipment has been employed for some time. As a result, it is quite common to be unable to separate various units of laboratory equipment after use, and as a result equipment having such frozen joints therein is discarded and destroyed.

Another problem which is quite significant is the fact that since these taper joints are usually difficult to separate after they have been tightly interengaged with one another, the glass material of the laboratory equipment units has a tendency to collapse when excessive force is applied thereto in an effort to release the joint. As a result, personnel handling the equipment may severely cut their hands. In any event, the separation of such conventional joints employed for connecting units of laboratory equipment is extremely difficult.

A further disadvantage of the utilization of such standard taper joints lies in the fact that when a large array of laboratory equipment units is provided with many units interconnected with one another, and it is necessary to remove or replace an intermediate unit somewhere in the array, such removal and replacement is extremely difficult, particularly if the various units are somehow fixed as by clamps or the like in a particular relationship to one another. Since the standard taper joints can only be separated by moving the associated laboratory equipment units in a direction longitudinally of the joints to separate the joints, it may be necessary to lift up entire portions of the laboratory equipment system in order to remove a single unit thereof. This is a major drawback particularly in those cases wherein the laboratory equipment system may extend a considerable distance up into the air, for example.

It is also impossible to apply very much pressure to such standard taper joints to hold them in place, and efforts along this line have involved the use of ears on the adjacent pieces of laboratory equipment in combination with tension springs connected between such ears to urge the pieces of laboratory equipment toward one another. A further effort along these lines involves the use of ball joint connections between adjacent laboratory equipment units along with a clamp means for holding them together. In general, these types of arrangements have not proved satisfactory in use when it is necessary to apply considerable pressure to the joints.

Another problem involved with the use of such standard taper joints is the fact that they offer a considerable obstruction to flow. In other words, the inner diameter of the tubular portions of the laboratory equipment units vary considerably and have pronounced steps therein which create considerable turbulence which is undesirable when chemicals or the like are flowing therethrough.

Another disadvantage of this type of prior art construction is that it is not feasible to readily insert filter paper or the like between the adjacent units of laboratory equipment since the construction of standard taper joints will not readily accommodate such an arrangement.

Efforts have been made in the prior art to provide an arrangement for connecting adjacent laboratory equipment units together by means of a screw thread arrangement. In the prior art, in order to accomplish this type of a connection, a tubular glass portion is first ground and then a metallic fitting, generally formed of brass, is cemented on the ground portion of the tubular glass means, this metallic fitting having threads formed thereon. This type of arrangement has proved unsatisfactory since the metal and glass components do not readily adhere to one another and do not hold together over extended periods of use. A further disadvantage of this type of construction is the fact that the coefficients of expansion of the metal and the glass are different, and as a result, the metal portion of the connection has a tendency to crack the glass, thereby irrevocably damaging the equipment.

SUMMARY OF THE INVENTION

The present invention incorporates a unique structure including a tubular glass means on a first unit or portion of the laboratory equipment, this tubular glass means having an open end portion with integral machine threads formed on the outer surface thereof. A coupling or connector member includes a portion for receiving and holding a tubular portion of a second unit of laboratory equipment means, the coupling or connector member also including a threaded recess in one end thereof which is adapted to be threaded on the machine threads of said tubular glass means.

Additionally, retainer means is provided on said second unit of laboratory equipment means for engaging and retaining the coupling or connector member in position relative thereto. This retainer means is important since it enables the associated unit of laboratory equipment means to be heat treated and annealed, and the connector member which is preferably formed of a plastic which cannot withstand such annealing temperatures may be subsequently assembled in operative relationship.

The problems encountered with prior art arrangements as discussed hereinabove are substantially eliminated with the invention arrangement. Firstly, the various portions of the cooperating laboratory equipment means may be machined with automatic machinery as necessary. For example, the machine threads formed on the tubular glass means may be formed with automatic machines, and groove means formed in one of the laboratory equipment means comprising at least a portion of the retainer means may also be formed with automatic equipment. The amount of hand labor is reduced to a minimum in the present invention.

Considerable pressure may be applied with the threaded interengagement of the components of the present invention so that the assembled portions of laboratory equipment will hold a high vacuum without the necessity of employing grease or additional means for obtaining such as effective sealing arrangement between the portions of laboratory equipment.

A particularly important advantage of the present invention is the fact that the novel coupling or connector means for connecting the laboratory equipment means with one another does not have a tendency to freeze together and can be readily separated even after extensive use. The arrangement also enables the ready insertion of washer means when corrosion becomes a problem. Since the connector means can be readily released, there is virtually no hazard of personnel handling the equipment cutting their hands, particularly in view of the fact that the connector member which is manually grasped when releasing the connector means is preferably formed of a tough and pliable plastic material.

A further significant advantage of the present invention is that it is not necessary to move adjacent units of laboratory equipment longitudinally with respect to one another in order to remove an individual unit, but on the contrary, any particular individual unit of laboratory equipment may be moved laterally with respect to the adjacent units so that any one unit can be removed without disturbing the operative position of any of the other units of the laboratory equipment system.

The threaded arrangement of the present invention enables considerable longitudinal pressure to be applied between the cooperating laboratory equipment means, and the necessity of providing ears and associated springs or ball joints with clamping means is completely eliminated.

The assembled laboratory equipment means of the present invention also provides an inner diameter of substantially constant dimensions so that there is practically no obstruction to flow of liquids therethrough and turbulence is substantially eliminated.

A further advantage of the arrangement of the present invention is the fact that filter paper or the like can be readily inserted between the cooperating portions of laboratory equipment means if so desired.

Additionally, the present invention eliminates the necessity of mounting a metal fitting on a piece of glass laboratory equipment when threads are desired, since in the arrangement of the present invention machine threads are provided directly on the tubular glass means of the laboratory equipment means.

The present invention provides important savings in space and material, this arrangement being both of less length and less outer diameter than conventionally employed structures.

The novel connector means for connecting the laboratory equipment means also serves to center them with respect to one another and eliminates the necessity of twisting the adjacent units of laboratory equipment when separating such units as has been the case with standard taper joints.

BRIEF DESCRIPTION OF THE DRAWINGS

FIG. 2 are views partly in section illustrating a standard taper joint of the prior art;

FIG. 3 are views partly in section illustrating laboratory equipment according to the present invention;

FIG. 4 is a view of a prior art connecting tube;

FIG. 5 is a view partly in section illustrating a connecting tube according to the present invention;

FIG. 6 is an adapter as employed in the prior art;

FIG. 7 is an adapter incorporating the arrangement of the present invention;

FIG. 8 is a sectional view through laboratory equipment according to the present invention and illustrating a first form thereof, the structure being shown in assembled relationship;

FIG. 9 is a view of the structure shown in FIG. 8 in disassembled relationship;

FIG. 10 is a view similar to FIG. 8 illustrating the modification thereof in assembled relationship;

FIG. 11 is a view of the structure shown in FIG. 10 in disassembled relationship;

FIG. 12 is a sectional view through a further modified form of the invention in assembled relationship;

FIG. 13 illustrates the structure of FIG. 12 in disassembled relationship;

FIG. 14 is a longitudinal section through a still further modified form of the invention;

FIG. 15 is a sectional view taken substantially along line 15—15 of FIG. 14 looking in the direction of the arrows;

FIG. 16 is a top perspective exploded view of certain components of the structure shown in FIG. 14;

FIG. 17 is a sectional view through still another form of the invention showing the parts in assembled relationship;

FIG. 18 is a view of the structure shown in FIG. 17 in disassembled exploded relationship;

FIG. 19 is a top perspective view of another form of the present invention;

FIG. 20 is a longitudinal section through the structure shown in FIG. 19;

FIG. 21 is a sectional view on an enlarged scale of a modification of the structure shown in FIG. 20;

DESCRIPTION OF THE PREFERRED EMBODIMENTS

Figure 1:
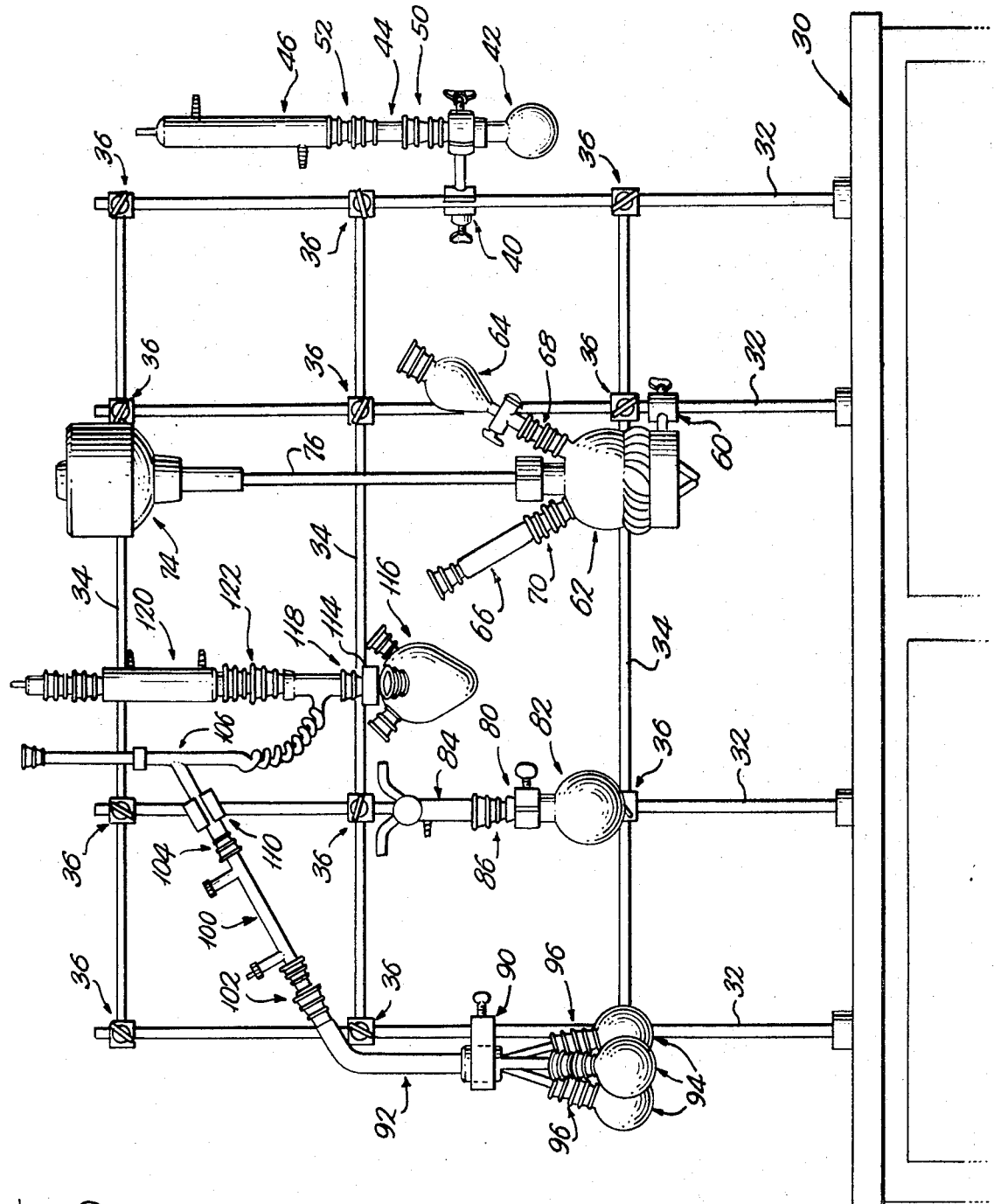
FIG. 1 illustrates a laboratory equipment system as commonly employed in chemistry laboratories employing conventional standard taper joints according to the prior art.

Referring now to the drawings wherein like reference characters designate corresponding parts throughout the several views, FIG. 1 illustrates a typical array of laboratory equipment employed as a small organic chemistry laboratory and the like. A suitable support means such as a table indicated generally by reference numeral 30 has a plurality of vertically extending support members 32 supported thereon, these vertically extending support members being interconnected with a plurality of spaced horizontally extending support members 34 by a plurality of clamping means indicated generally by reference characters 36.

As seen at the extreme right of this illustration, a conventional clamp 40 is mounted upon the right-handmost vertical support member 32, and a conventional flask 42 is supported by the clamp. An adapter 44 is in turn operatively connected with the flask 42 and a conventional condenser 46 is operatively connected with the upper end of adapter 44. Typical standard taper joints are indicated by reference numerals 50 and 52 for interconnecting the members with one another. These conventional units of laboratory equipment as well as the remainder of those illustrated in FIG. 1 are of the usual construction and are illustrated for example in the catalog of Labglass, Incorporated, North West Blvd., Vineland, N.J. A clamp 60 supports a pear-shaped three-neck flask indicated generally by reference numeral 62, and a separatory funnel indicated by reference numeral 64 is operatively connected with one of the necks of the flask. A conventional condenser 66 is operatively connected with another of the necks of the flask. Conventional standard taper joints are indicated generally by reference numerals 68 and 70. A motor-driven stirrer 74 is supported by the uppermost horizontal support member 34 and includes a depending rod 76 extending through another neck of the flask 62 for stirring the contents of the flask, a suitable stirring device being secured to the lower end of rod 76.

A further clamp 80 is supported by one of the vertically extending support members 32 and holds a flask 82 in operative position. A condenser 84 is operatively connected with the flask, and the conventional standard taper joint for connecting these laboratory equipment units to one another is indicated generally by reference numeral 86.

A further clamp 90 is supported by another of the vertical support members 32 and serves to support a distilling receiver indicated generally by reference numeral 92. A plurality of flasks 94 are connected to the lower end of receiver 92, and the conventional taper joints for connecting the flasks to the receiver are indicated generally by reference numerals 96. The upper end of distilling receiver 92 is connected with a condenser 100 by means of a conventional taper joint 102, the opposite end of the condenser being connected by taper joint 104 with a distilling head indicated generally by reference numeral 106 and being held in place by a clamp 110 mounted on one of the vertical support members 32.

A clamp 114 supports a flask 116 from one of the horizontal support members 34, this flask being connected by a standard taper joint indicated generally by reference numeral 118 with a portion of the distilling head. A condenser 120 is also interconnected with a portion of the distilling head by a standard taper joint indicated by reference numeral 122.

It will be apparent from the foregoing that the laboratory equipment system according to the prior art may comprise a plurality of rather complex units of laboratory equipment all of which are interconnected with one another by standard taper joints. If it is desired to remove a particular unit such as the condenser 100 of the array described hereinabove, it is apparent that considerable difficulty is encountered since it is of course necessary to move adjacent portions of the apparatus in order to remove condenser 100, and if difficulty is encountered in separating one or more of the taper joints, the entire apparatus may have to be disassembled and portions thereof discarded which of course is a very inconvenient and expensive process.

Referring now to FIG. 2, a conventional standard taper joint arrangement as employed in the prior art is illustrated. A first tubular glass member indicated generally by reference numeral 130 includes a generally frusto-conical end portion 132 defining a smooth inner frusto-conical surface for receiving a cooperating part on another tubular glass member. These members are hand tooled for uniform heavy wall construction and thoroughly annealed to remove all strain. Reinforcing rings 134 are provided around the end portion thereof to provide a better grip for assembling and cleaning purposes. A similar tubular glass member 136 is provided with a frusto-conical end portion 138 having reinforcing rings 140 extending therearound.

A further tubular glass member 144 is provided with a frusto-conical end portion 146 defining a smooth outer frusto-conical surface adapted to snugly fit within the inner frusto-conical surface of the end portion 132 of the previously described tubular member 130. Reinforcing rings 148 are provided around tubular member 144. The opposite end of member 144 includes a frusto-conical end portion 150 defining a smooth outer surface adapted to fit snugly within the inner surface of the end portion 138 of tubular member 136. Reinforcing rings 152 extend around end portion 150 of tubular member 144. The construction as illustrated in FIG. 2 is conventional and well known in the art and presents many problems in use as discussed hereinabove.

Referring now to FIG. 3 of the drawing, this figure illustrates the present invention in both assembled and disassembled positions. A first laboratory equipment means indicated generally by reference numeral 160 comprises a tubular glass means having an open end portion with integral machine threads 162 formed on the outer surface thereof. These machine threads have a fine sharp profile as illustrated. It has heretofore been impossible to successfully machine this type of thread on glass, but this problem has now been solved utilizing apparatus such as illustrated in copending U.S. patent application Ser. No. 654,210, filed July 18, 1967.

The tubular glass means 160 is provided with a circumferentially extending groove 164 on the outer surface thereof adjacent the end thereof opposite to that upon which the threads 162 are formed. A suitable retaining ring 166 is disposed within this groove.

A generally cylindrical shaped coupling or connector member indicated generally by reference numeral 170 which is preferably formed of a suitable plastic material is disposed about tubular glass means 160 and is retained thereon by the retainer ring 166. Member 170 is provided with internal threads 172 which are adapted to be threaded upon the machine threads formed on a cooperating tubular glass means.

As illustrated in FIG. 3, a pair of similar cooperating tubular glass means 160' are provided, and are connected with tubular glass means 160 by means of a novel coupling or connector arrangement according to the present invention to provide an effective seal between adjacent glass means, and at the same time enabling ready release of the connector member and removal of a particular laboratory equipment unit whenever desired. The details of constructions of the arrangement illustrated in FIG. 3 are more fully set forth hereinafter.

Referring now to FIG. 4, a typical connecting tube of a construction common in the prior art is illustrated. The connecting tube 180 is provided with a first end portion 182 defining a substantially frusto-conical outer surface, the opposite end portion 184 having a generally frusto-conical recess formed therein for receiving a portion such as portion 182 so as to provide a conventional standard taper joint when connected with a cooperating unit of laboratory equipment.

Referring now to FIG. 5, a connecting tube according to the present invention is illustrated. The connecting tube 190 is formed of glass as is connecting tube 180, and is provided with integral machine threads around the open end portion thereof.

A retainer ring 194 is disposed within a circumferential groove provided about the opposite end portion of connecting tube 190, and a coupling or connector member 196 substantially identical to the connector member 170 previously described is held in place by retainer ring 194. Connector member 196 is provided with internal threads 198 adapted to be threaded upon the machine threads formed on a cooperating unit of laboratory equipment.

Referring now to FIG. 6 of the drawings, a conventional three-way connecting tube is illustrated by reference numeral 200, a pair of outer frusto-conical surfaces 202 and 204 being provided at two open ends of the tube, a frusto-conical inner surface being provided at the open end 206 of the connecting tube for receiving a frusto-conical portion such as 202 and 204 to provide a conventional standard taper joint.

Referring now to FIG. 7, a three-way connecting tube according to the present invention is illustrated. This connecting tube 210 is formed of glass as is connecting tube 200, and is provided with integral machine threads 212 formed about one open end thereof.

A pair of coupling or connector members 214 and 216 substantially identical to the connector member 170 previously described are mounted about the other two open ends of the connecting tube in a manner similar to that previously described.

Referring now to FIGS. 8 and 9, an enlarged view of a portion of the structure shown in FIG. 3 is illustrated. The coupling or connector member 170 is preferably formed as a one-piece plastic construction, and may for example be formed of Teflon, nylon, or polyethylene and the like. These connector members may be molded thereby eliminating the necessity of tooling.

Each connector member 170 includes an end wall 220 and a substantially cylindrical side wall 222 which defines a recess for receiving a threaded end of a cooperating tubular glass means, internal threads 172 being formed within this recess.

The end wall 220 has a hole 224 formed centrally therethrough, this hole being of smaller cross-sectional dimension that the recess defined within the side wall 222, hole 224 also having a slight clearance with respect to the outer diameter of the associated tubular glass means 160 to permit it to be readily slit therealong. In a typical example, the hole 224 may have a diameter approximately 1/1000 of one inch greater than the outer diameter of tubular glass means 160.

It will be noted that the end portion of tubular glass means 160' as seen in FIG. 8 is of greater thickness where the machine threads 162' are formed in order to retain adequate strength.

The annular retainer member 166 is preferably formed of a suitable plastic material such as Teflon or the like, and may be formed of the same material as the connector member.

The one outer end of tubular glass means 160 is ground or polished so as to provide an arcuate surface 230 formed on a radius. The inner lip 232 of this end of the tubular glass means is chamfered as illustrated. The cooperating or interengaging end of tubular means 160' as seen in FIG. 8 is ground or polished to provide a complementary arcuate inner edge 234 formed on a radius. Accordingly, when the surfaces 230 and 234 are brought into contact with one another, a chromatic or optical surface contact is obtained which ensures a very good seal even under high vacuum. It is apparent that when connector member 170 is threaded onto the threads 162' of tubular glass means 160', the two tubular glass means will be drawn longitudinally toward one another when the end wall 220 of connector member 170 engages the retainer ring 166. Accordingly, considerable pressure can be applied simply by rotating connector member 170 to urge the two cooperating tubular glass means tightly together.

When it is desired to release the interconnected glass means, the coupling or connector member 170 is simply rotated in the opposite direction to disengage the threads of the connector member from the threads on the tubular glass means 160', whereupon the tubular glass means 162' can be moved laterally with respect to unit 160. It is evident that this arrangement permits the adjacent units of laboratory equipment to be readily assembled and interconnected with one another as well as released while affording the advantages hereinbefore discussed.

Referring now to FIGS. 10 and 11, the construction is substantially identical with that shown in FIGS. 8 and 9 with the exception that a washer 238 is interposed between the end surfaces of the adjacent laboratory equipment units. As seen in FIG. 11, the washer is initially flat, and may be formed of a suitable plastic material such as Teflon or the like. When the washer is inserted in operative position as seen in FIG. 10, it will conform to the shape of the adjacent surfaces 230 and 234 as illustrated.

The arrangement as shown in FIGS. 10 and 11 is particularly suitable where the materials being handled by the laboratory equipment are of such a nature as to present a corrosion problem. It should also be noted that a piece of filter paper or the like could readily be inserted between the end surfaces of adjacent units as seen in FIGS. 10 and 11 in place of the washer as indicated by phantom line 239 in FIG. 10. It will also be noted as seen in FIG. 10 that when the washer is in assembled position, the inner diameter thereof is substantially the same as the inner diameter of the adjacent units of laboratory equipment so that there is substantially no interference with flow therethrough. It is of course apparent that the inner diameters of adjacent tubular portions of the laboratory equipment according to the present invention may be made substantially the same so as to reduce turbulence to a minimum.

Referring now to FIGS. 12 and 13 of the drawings, a further modification of the present invention is illustrated. A tubular glass means 240 has integral machine threads 242 formed about an open end thereof. The adjacent tubular glass means 246 has a circumferentially extending annular groove 248 formed in the outer surface thereof about one end portion thereof. It will be understood in this modification as well as the remaining modifications that the structures illustrated at each end of a tubular glass means may of course be provided on the opposite ends of a single laboratory equipment unit.

A coupling or connector member 250 comprising a one-piece plastic construction includes an end wall 252 having a hole 254 formed therethrough, this hole having a diameter so as to permit it to be snapped snugly into place within the groove 248 formed in tubular glass means 246. The natural resiliency of the material of the connector member will permit it to be snapped into the operative position illustrated in FIG. 12.

The connector member also includes a side wall 256 defining a recess in the end thereof having internal threads 258 formed therein, these threads being adapted to thread onto the threads 242 formed on the cooperating tubular glass means 240. The two adjacent units of laboratory equipment are provided with complementary end surfaces as in the previous modification so as to provide an effective seal therebetween when in the operative position shown in FIG. 12.

It is evident that the form of the invention illustrated in FIGS. 12 and 13 eliminates the necessity of providing an additional retainer means as employed in certain other forms of the invention.

Referring now to FIGS. 14 and 15, a still further modified form of the invention is illustrated. A tubular glass means 262 is provided having integral machine threads 264 formed about the open end thereof in a manner similar to that previously described.

A second tubular member indicated generally by reference numeral 270 is formed of metal in this form of the invention, the tubular member being provided with a circumferentially extending groove 272 formed about one end portion thereof and receiving an annular split snap ring 274 which as seen in FIG. 16 has the opposite ends thereof spaced from one another to define a gap 276. this snap ring is snapped into operative position as seen in FIG. 14 to serve as a retainer ring similar to the retainer rings previously described. The snap ring is also formed of a suitable metallic substance in this form of the invention.

The coupling or connector member is substantially identical with those previously described, the connector member being indicated generally by reference numeral 278 and comprising a one-piece plastic construction. The connector member includes an end wall 280 having a central hole 282 formed therethrough, the diameter of this central hole being slightly greater than that of the outer diameter of tubular means 270 to permit the connector member to slide relative thereto. The hole through the end wall of the connector member is of less cross-sectional dimension than the recess defined within the side wall 284 of the connector member as in the previous modifications of the invention.

Internal threads 286 are formed within the side wall 284 and are adapted to thread upon the external threads 264 formed on tubular glass means 262. A suitable washer 290 is provided, and as seen in FIG. 16 it is normally in its free form of a flat annular configuration. The washer is interposed between the end surfaces of the two tubular portions 262 and 270 as seen in FIG. 14, these end surfaces being formed on the radius as in the previously described modifications. The washer 290 will conform to the configuration of these end surfaces and will enable an effective seal to be obtained therebetween.

Referring now to FIGS. 17 and 18, a further form of the invention is illustrated wherein a tubular glass means 300 is provided with integral machine threads 302 formed about the open end thereof as in the previous forms of the invention. The end surface 304 of this tubular glass means as seen most clearly in FIG. 18 is formed on a radius as in the previous modifications.

A second laboratory equipment means comprises a tubular portion 306 formed of a suitable plastic material such as polyethylene or the like having an annular outwardly flared lip 308 formed at the lower end thereof as seen in these figures. This arrangement is typical of tubing as used in laboratory equipment.

The coupling or connector member employed in this form of the invention is indicated generally by reference numeral 310 and includes an end wall 312 having a central hole 314 formed therethrough of slightly greater diameter than the outer diameter of portion 306 so as to be slidable therealong. It is apparent that in this construction, the annular lip 308 will serve as the retainer means to retain the connector member in operative position. The connector member also includes a side wall 316 defining a recess therewithin having internal threads 318 formed therearound for engaging the threads 302 on the tubular glass means 300.

A washer or grommet indicated generally by reference numeral 322 may be formed of a suitable plastic material such as Teflon, and has a central hole 324 formed therethrough. The outer surface 326 of the washer is of double tapered configuration as seen most clearly in FIG. 18.

As illustrated in FIG. 17, when the components of this form of the invention are in assembled operative relationship with respect to one another, the washer 322 is disposed between the facing ends of the tubular portions 300 and 306. The upwardly facing sloping outer surface portion of the washer engages the inner surface of the lip 308, while the downwardly facing sloping outer surface of the washer is adapted to cold flow so as to conform to the configuration of the end surface 304 of tubular glass means 300.

An internal generally frusto-conical shoulder 328 is formed on the inner surface of the side wall 316 of the connector member and is adapted to engage the end of tubular glass means 300 for accurately positioning the connector member with respect to the tubular glass means and for limiting relative movement therebetween. In the operative position illustrated in FIG. 17, a very effective and tight seal will be obtained between the tubular portions thereof.

Referring now to FIGS. 19 and 20, a further form of the invention is illustrated. A glass flask indicated generally by reference numeral 330 includes a tubular thermometer well 332 open at the upper end thereof and having integral machine threads 334 formed therearound. The upper end surface 336 of the thermometer well is formed on a radius.

A second laboratory equipment means comprises a tubular glass portion indicated generally by reference numeral 340 having integral machine threads 342 formed about the upper end thereof. The upper surface 344 of this upper portion is of generally frusto-conical configuration as illustrated, and a bore 346 extends longitudinally through portion 340. The lower enlarged end portion of portion 340 includes a surface 350 formed on the radius and is complementary to surface 336 formed on the thermometer well so as to fit snugly thereagainst and form a seal therewith. This lower enlarged portion of tubular portion 340 also defines an annular shoulder 352.

A coupling or connector member is indicated generally by reference numeral 356, the connector member including an end wall 358 having a central hole 360 formed therethrough adapted to fit snugly around a portion of tubular member 340. It will be noted that the connector member is retained in operative position on tubular member 340 by the annular shoulder 352. The connector member also includes a side wall 362 which is substantially cylindrical and defines a recess therein having internal threads 364 formed therein for engaging the threads 334 on the thermometer well.

A further coupling or connector member 370 of reduced dimension includes an end wall 372 having a central hole 374 formed therethrough. The connector member also includes a side wall 376 having internal threads 378 formed thereon which are adapted to thread onto the integral machine threads 342 formed around the upper open end of tubular portion 340. This connector member as well as connector member 356 may be of one-piece plastic or glass construction.

A thermometer indicated by reference numeral 380 extends through the hole in connector member 370 and thence downwardly through the longitudinal bore formed therein, the lower end of the thermometer being disposed within a lower portion of the thermometer well 332.

In order to provide an effective seal between the thermometer and the laboratory equipment associated therewith, a sealing member 382 is interposed between the upper end surface 344 of tubular portion 340 and the connector member 370. Sealing member 382 may comprise an annular O-ring formed of rubber or similar material which is compressed when connector member 370 is threaded into operative position and urged into tight sealing engagement with the thermometer 380.

Referring now to FIG. 21, a different form of sealing means is illustrated. Tubular portion 340' corresponds to the tubular portion 340 and has threads 342' formed therearound similar to the threads 342 previously described. The connector member 370' is identical in construction to the connector member 370, and thermometer 380' is similar to the thermometer 380.

In this form of the invention, the upper surface of tubular portion 340' indicated by reference numeral 390 is substantially flat. The sealing means employed in this form of the invention comprises a generally frusto-conical washer 390 which may be formed of a suitable plastic substance such as Teflon or the like. The washer is disposed as illustrated in FIG. 21 in surrounding relationship to the thermometer, and when the connector member is threaded downwardly, the washer is urged into tight sealing engagement with the thermometer.

Figure 22:
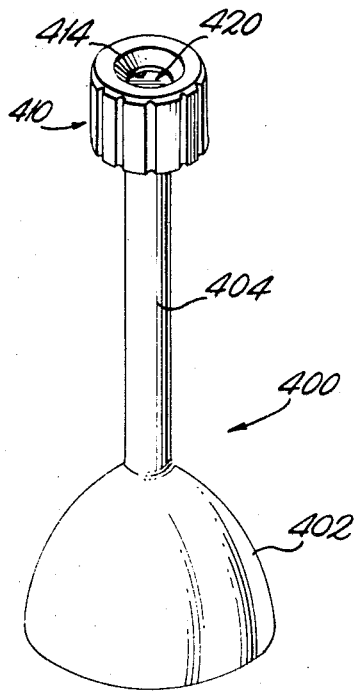
FIG. 22 is a top perspective view of another form of the invention.
Figure 23:
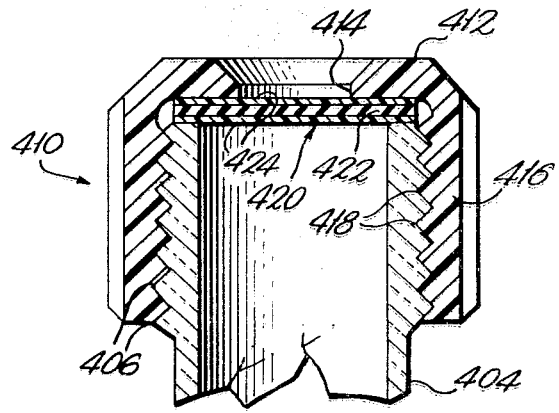
FIG. 23 is a vertical section on an enlarged scale through the upper portion of the structure shown in FIG. 22.

Referring now to FIGS. 22 and 23, a further form of the invention is illustrated. A bottle is indicated generally by reference numeral 400 and includes a lower enlarged portion 402 and an upwardly extending reduced tubular portion 404. This bottle is formed of glass, and as seen most clearly in FIG. 23, the upper end of tubular portion 404 has integral machine threads 406 formed therearound.

A coupling or connector member 410 includes an end wall 412 having a central hole 414 formed therethrough. The connector member also includes a side wall 416 defining a recess having internal threads 418 formed therearound adapted to engage the threads 406 formed on tubular portion 404.

A septum 420 is interposed between the flat upper end of tubular portion 404 and the undersurface of the end wall 412 of the connector member 410. The septum includes a central layer 422 formed of self-sealing rubber or the like, and this central layer of rubber may be provided with thin liners 424 on the upper and lower surfaces thereof, these liners being formed of a suitable plastic substance such as polyethylene or Teflon and the like.

As seen in FIG. 23, it will be noted that when the components are in the operative position, the hole through the connector member is sealed. The septum may be readily punctured by a hypodermic needle or the like, and this type of arrangement is particularly useful for storing vaccines, viruses and the like wherein it is desired from time to time to remove a portion of the contents of the bottle through the septum.

Figure 24:
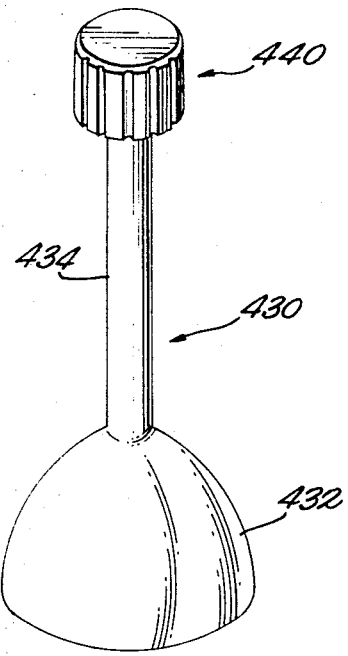
FIG. 24 is a top perspective view of a further modification of the invention.
Figure 25:
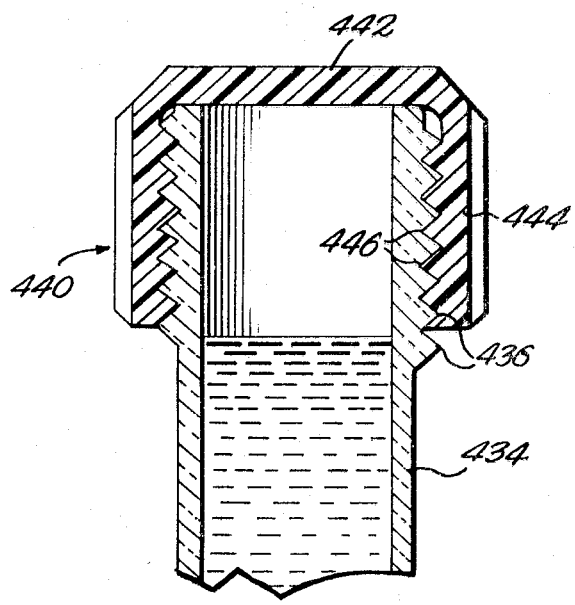
FIG. 25 is a vertical section on an enlarged scale through the upper portion of the structure shown in FIG. 24.

Referring now to FIGS. 24 and 25, a further modification of the present invention is illustrated. A bottle indicated generally by reference numeral 430 is formed of glass and includes an enlarged lower portion 432 and a reduced upwardly extending tubular portion 434. As seen most clearly in FIG. 25, the upper end of the tubular portion is provided with integral machine threads 436 extending therearound.

A cap 440 includes an end wall 442 which is substantially uninterrupted and which joins with a generally cylindrical side wall 444 defining a recess therewith having threads 446 extending therearound and adapted to engage the threads 436 formed on tubular portion 434 of the bottle. It is apparent that the cap enables the upper end of the bottle to be effectively sealed, and yet the cap may be readily removed when desired.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

What is claimed is:

1. Laboratory equipment comprising a plurality of unique separate and independent tubular means adapted to be interconnected to provide a laboratory equipment system, cooperating seal means on said tubular means, cooperating connector means on said tubular means for rigidly interconnecting said tubular means to one another to provide said laboratory equipment system which affords an effective seal between adjacent tubular means and at the same time permits ready removal or replacement of one of said tubular means without disturbing the position of adjacent tubular means, a first one of said tubular means made of glass and having an open end portion, integral machine threads on the outer surface of said tubular glass means, a second tubular means adapted to be connected to said tubular glass means, the said connector means comprising a generally cylindrical shaped coupling member for connecting said tubular means together and having an end wall and an internally threaded cylindrical side wall, said threads on said side wall corresponing to said machine threads and adapted to cooperatively receive the machine threads on said tubular glass means, an opening through said end wall, a portion of said second tubular means received telescopically through said opening, retaining means on said second tubular means and said coupling member for holding said coupling member and said second tubular means against predetermined axial movement relative to each other said threaded coupling member in cooperation with said machine threaded tubular glass means enabling said first and second tubular means to be readily coupled together and uncoupled by manipulating said coupling member and moving said tubular means laterally and without requiring relative longitudinal movement between said tubular means.

2. Laboratory equipment including tubular glass laboratory equipment means having an open end portion, integral machine threads on the outer surface of said open end portion, a coupling member including an end wall and an internally threaded cylindrical side wall defining a recess in one end of the coupling member, sealing means cooperating with said coupling member, said threads on said side wall corresponding to said machine threads on said tubular glass means for cooperatively receiving and engaging the machine threads on said tubular glass means, said coupling member in cooperation with said machine threads on said tubular glass means enabling said coupling member and said tubular glass means to be readily coupled together and uncoupled with a minimum of force and effort and at the same time affording a secure and sealed connection therebetween.

3. Laboratory equipment as defined in claim 2 including second laboratory equipment means, said tubular glass laboratory equipment means and said second laboratory equipment means having end portions, the end portions being complementary to one another and engageable with one another to form a seal therebetween, said second laboratory equipment means including a tubular portion, the end wall of said coupling member having a hole therethrough for receiving the tubular portion of said second laboratory equipment means.

4. Laboratory equipment as defined in claim 3 wherein the hole through the end wall of the coupling member is of smaller cross-sectional dimension than said recess defined by the side wall of the coupling member.

5. Laboratory equipment as defined in claim 3 wherein said coupling member is of one-piece plastic construction.

6. Laboratory equipment as defined in claim 3 wherein said end portions of the tubular glass laboratory equipment means and the second laboratory equipment means have washer means interposed therebetween.

7. Laboratory equipment as defined in claim 3 wherein the outer end of said tubular glass means having the machine threads therearound includes an inner lip, said inner lip being relieved at said outer end portion of the tubular glass means.

8. Laboratory equipment as defined in claim 3 including retainer means for engaging and retaining said coupling member in position relative to said second laboratory equipment means.

9. Laboratory equipment as defined in claim 8 wherein said retainer means includes a circumferentially extending groove formed in the outer surface of the tubular portion of said second laboratory equipment means.

10. Laboratory equipment as defined in claim 9 including a generally annular retainer member disposed within said groove.

11. Laboratory equipment as defined in claim 10 wherein said retainer member is formed of plastic.

12. Laboratory equipment as defined in claim 10 wherein said retainer member comprises a split metal ring.

13. Laboratory equipment as defined in claim 9 wherein a portion of the end wall of said coupling member is received within said groove.

14. Laboratory equipment as defined in claim 8 wherein said retainer means includes an annular shoulder formed on said second laboratory equipment means.

15. Laboratory equipment as defined in claim 8 wherein said retainer means includes an annular outwardly extending lip formed at one end of the tubular portion of said second laboratory equipment means.

16. Laboratory equipment as defined in claim 15 including a washer having an outer surface of tapered configuration, said washer being disposed between the adjacent end portions of said tubular glass laboratory equipment means and said second laboratory equipment means and being in engagement therewith.

17. Laboratory equipment as defined in claim 3 wherein said second laboratory equipment means is of metallic construction.

18. Laboratory equipment as defined in claim 17 including retainer means for retaining said coupling member on said second laboratory equipment means, said retainer means including a circumferentially extending groove formed in the outer surface of the tubular portion of said second laboratory equipment means, and a split metal ring disposed within said groove.

19. Laboratory equipment as defined in claim 2 wherein said end wall has a hole therethrough, and septum means disposed adjacent said end wall of the coupling member and closing said hole through the end wall of the coupling member.

20. Laboratory equipment as defined in claim 2 wherein the end wall of said coupling member is substantially uninterrupted.

21. Laboratory equipment as defined in claim 3 wherein said complementary end portions of the tubular glass laboratory equipment means and second laboratory equipment means have chromatic or optical surfaces thereon to ensure a very good seal even under high vacuum.

22. Laboratory equipment as defined in claim 3 wherein the said end portions of said tubular glass laboratory equipment means and second laboratory equipment means have filter means interposed therebetween.

References Cited

UNITED STATES PATENTS

| | | | |
|---|---|---|---|
| 2,110,237 | 3/1938 | Parsons | 23—292 X |
| 3,217,917 | 11/1965 | George | 215—73 X |
| 3,241,846 | 3/1966 | Peickii | 285—340 X |
| 3,323,874 | 6/1967 | Phillips | 23—292 |
| 3,342,696 | 9/1967 | Bush | 23—292 X |

FOREIGN PATENTS 828,368  2/1960  Great Britain.

JOSEPH SCOVRONEK, Primary Examiner

U.S. Cl. X.R.

65—61; 138—89, 109, 177; 215—43, 73; 285—334.3, 334.4, 334.5, 340, 423